(12) United States Patent
Lee et al.

(10) Patent No.: US 11,754,038 B2
(45) Date of Patent: Sep. 12, 2023

(54) WIND TURBINE BLADE AND WIND TURBINE INCLUDING THE SAME

(71) Applicant: DOOSAN ENERBILITY CO., LTD., Changwon-si (KR)

(72) Inventors: Sang Hoon Lee, Suwon (KR); In Gyu Oh, Hwaseong (KR); Seung Jun Lee, Seoul (KR); Wan Don Joo, Bucheon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/720,326

(22) Filed: Apr. 14, 2022

(65) Prior Publication Data

US 2022/0356864 A1    Nov. 10, 2022

(51) Int. Cl.
F03D 1/06 (2006.01)

(52) U.S. Cl.
CPC .... F03D 1/0675 (2013.01); *F05B 2280/6003* (2013.01)

(58) Field of Classification Search
CPC ............... F03D 1/0675; F05B 2240/30; F05B 2280/6003
See application file for complete search history.

(56) References Cited

U.S. PATENT DOCUMENTS

| 8,043,067 | B2 * | 10/2011 | Kuroiwa | F03D 1/0675 416/223 R |
|---|---|---|---|---|
| 2016/0040651 | A1 | 2/2016 | Yarbrough | |
| 2017/0218918 | A1 * | 8/2017 | Cieslak | B32B 5/024 |

FOREIGN PATENT DOCUMENTS

| EP | 2239461 A1 | 10/2010 | |
| EP | 3026259 A1 | 11/2015 | |
| EP | 3726049 A1 | 4/2019 | |
| EP | 3501810 A1 | 6/2019 | |
| EP | 3792049 A1 * | 3/2021 | ......... B29D 99/0028 |
| JP | 5078757 B2 | 11/2012 | |
| JP | 5675673 B2 | 2/2015 | |
| JP | 2017129091 A | 7/2017 | |
| JP | 2019218886 A | 12/2019 | |
| JP | 2020-510157 A | 4/2020 | |
| JP | 2020084812 A | 6/2020 | |
| KR | 1020130084612 A | 7/2013 | |
| KR | 1020140110951 A | 9/2014 | |

(Continued)

OTHER PUBLICATIONS

EESR, dated Sep. 23, 2022.
KR Office Action, dated Aug. 23, 2022.

*Primary Examiner* — Courtney D Heinle
*Assistant Examiner* — Sang K Kim
(74) *Attorney, Agent, or Firm* — Harvest IP Law, LLP (57) ABSTRACT

A wind turbine blade capable of being easily manufactured and improving structural strength, and a wind turbine including the same are provided. The wind turbine blade includes an outer skin defining an external appearance, an inner skin spaced apart from the outer skin, a plurality of spar caps positioned between the outer skin and the inner skin and spaced apart from each other in a thickness direction of the blade, and shear webs configured to connect the plurality of spar caps, wherein at least one of the plurality of spar caps has a structure in which a resin is impregnated with reinforcing fiber sheets, and the other spar caps each have a structure in which support plates including reinforcing fibers are stacked.

14 Claims, 4 Drawing Sheets

(56) References Cited

FOREIGN PATENT DOCUMENTS

| | | |
|---|---|---|
| KR | 101642066 B1 | 7/2016 |
| KR | 102250535 B1 | 5/2021 |
| KR | 102250536 B1 | 5/2021 |
| WO | 2013087078 A1 | 6/2013 |
| WO | 2016015736 A1 | 2/2016 |

\* cited by examiner

WIND TURBINE BLADE AND WIND TURBINE INCLUDING THE SAME

CROSS-REFERENCE TO RELATED APPLICATION

This application claims priority to Korean Patent Application No. 10-2021-0057987, filed on May 4, 2021, the disclosure of which is incorporated herein by reference in its entirety.

BACKGROUND

Technical Field

Apparatuses and methods consistent with exemplary embodiments relate to a wind turbine blade and a wind turbine including the same, and more particularly, to a wind turbine blade including a spar cap, and a wind turbine including the same.

Description of the Related Art

Wind power generation refers to a method for generating electric power by using a windmill to convert wind energy into mechanical energy (i.e., rotational force) and then driving a generator to obtain electrical energy.

Wind power generation is being actively invested in the United States and Asia as well as in Europe, because wind power is the most economical renewable energy source developed so far and it is an indefinite, cost-free, and clean energy source that can be generated using wind.

The wind turbine for wind power generation may be classified into a vertical-axis wind turbine and a horizontal-axis wind turbine according to the direction of the rotary shaft. For example, the horizontal-axis wind turbine has been mainly applied to commercial wind farms because the horizontal-axis wind turbine is more efficient and more stable than the vertical-axis wind turbine.

The wind turbine includes a plurality of blades, and each blade is provided with a spar cap to improve its strength. The spar caps are respectively disposed at an upper portion (i.e., suction side) and a lower portion (i.e., pressure side) of the blade and are connected through a shear web.

A plurality of spar caps may be installed in one blade. For example, four spar caps are installed between the core panels of the blade. Each spar cap must be bent and twisted according to the shape of the blade. However, the shape of the blade may be limited because it is difficult to bend or twist the spar cap depending on the constituent object. It is also necessary to prevent the formation of pores in the spar cap. If pores are formed in the spar cap, the strength of the spar cap may be decreased.

SUMMARY

Aspects of one or more exemplary embodiments provide a wind turbine blade capable of being easily manufactured while improving structural strength, and a wind turbine including the same.

Additional aspects will be set forth in part in the description which follows and, in part, will become apparent from the description, or may be learned by practice of the exemplary embodiments.

According to an aspect of an exemplary embodiment, there is provided a wind turbine blade including: an outer skin defining an external appearance, an inner skin spaced apart from the outer skin, a plurality of spar caps positioned between the outer skin and the inner skin and spaced apart from each other in a thickness direction of the blade, and shear webs configured to connect the plurality of spar caps, wherein at least one of the plurality of spar caps has a structure in which a resin is impregnated with reinforcing fiber sheets, and the other spar caps each have a structure in which support plates including reinforcing fibers are stacked.

The spar cap including the reinforcing fiber sheets may be coupled to one end of an associated one of the shear webs.

The spar caps each including the support plates may be coupled to the other ends of associated ones of the shear webs.

The blade may have an airfoil cross-section and may include a pressure side, a suction side, a leading edge through which wind enters, and a trailing edge through which wind exits. The blade may include a first spar cap positioned adjacent to the leading edge on the pressure side, a second spar cap positioned adjacent to the trailing edge on the pressure side, a third spar cap positioned adjacent to the leading edge on the suction side, and a fourth spar cap positioned adjacent to the trailing edge on the suction side.

The second spar cap may have a structure in which the resin is impregnated with the reinforcing fiber sheets.

The first spar cap may have a structure in which the support plates including the reinforcing fibers are stacked.

Each of the third spar cap and the fourth spar cap may have a structure in which the support plates including the reinforcing fibers are stacked.

The support plates may be bonded through a resin bonding layer.

Each of the second spar cap and the fourth spar cap may have a structure in which the resin is impregnated with the reinforcing fiber sheets.

The support plates may be configured such that an outer support plate has a smaller width than an inner support plate.

According to an aspect of another exemplary embodiment, there is provided a wind turbine including: a tower installed upright, a nacelle installed on the tower, and a rotor rotatably installed on the nacelle and including a plurality of blades. Each of the plurality of blades includes an outer skin defining an external appearance, an inner skin spaced apart from the outer skin, a plurality of spar caps positioned between the outer skin and the inner skin and spaced apart from each other in a thickness direction of the blade, and shear webs configured to connect the plurality of spar caps, wherein at least one of the plurality of spar caps has a structure in which a resin is impregnated with reinforcing fiber sheets, and the other spar caps each have a structure in which support plates including reinforcing fibers are stacked.

The spar cap including the reinforcing fiber sheets may be coupled to one end of an associated one of the shear webs.

The spar caps each including the support plates may be coupled to the other ends of associated ones of the shear webs.

The blade may have an airfoil cross-section and may include a pressure side, a suction side, a leading edge through which wind enters, and a trailing edge through which wind exits. The blade may include a first spar cap positioned adjacent to the leading edge on the pressure side, a second spar cap positioned adjacent to the trailing edge on the pressure side, a third spar cap positioned adjacent to the leading edge on the suction side, and a fourth spar cap positioned adjacent to the trailing edge on the suction side.

The second spar cap may have a structure in which the resin is impregnated with the reinforcing fiber sheets.

The first spar cap may have a structure in which the support plates including the reinforcing fibers are stacked.

Each of the third spar cap and the fourth spar cap may have a structure in which the support plates including the reinforcing fibers are stacked.

The support plates may be bonded through a resin bonding layer.

Each of the second spar cap and the fourth spar cap may have a structure in which the resin is impregnated with the reinforcing fiber sheets.

The support plates may be configured such that an outer support plate has a smaller width than an inner support plate.

BRIEF DESCRIPTION OF THE DRAWINGS

The above and other aspects will become more apparent from the following description of the exemplary embodiments with reference to the accompanying drawings, in which.

DETAILED DESCRIPTION

Various modifications and different embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. It will be further understood that the terms "comprises/includes" and/or "have/has" when used in this specification, specify the presence of stated features, integers, steps, operations, components, parts, and/or combinations thereof, but do not preclude the presence or addition of one or more of other features, integers, steps, operations, components, parts, and/or combinations thereof.

Hereinafter, exemplary embodiments will be described with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Figure 1:
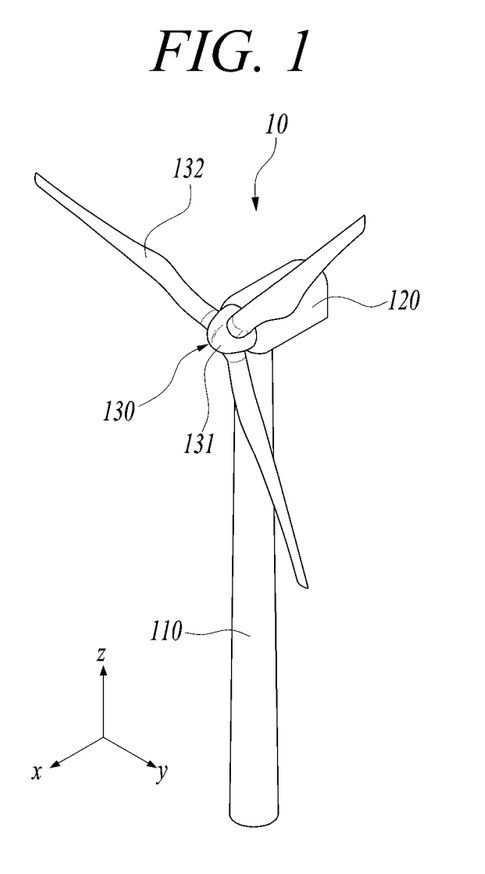
FIG. 1 is a perspective view illustrating a wind turbine according to a first exemplary embodiment.

FIG. 1 is a perspective view illustrating a wind turbine according to a first exemplary embodiment.

Referring to FIG. 1, the wind turbine 10 includes a tower 110, a nacelle 120, and a rotor 130. The wind turbine 10 may be installed on land or offshore, and may be a direct type with or without a gearbox.

The tower 110 is installed standing up at a certain height on the ground or offshore, and supports the nacelle 120 and the rotor 130. The tower 110 may have a tubular shape that increases in diameter from top to bottom. In this case, the tower 110 may have a multistage form in which a plurality of tubular members are stacked. For example, the inside of the tower 110 may be provided with a stair, a conveyor, or an elevator for transporting a worker or a work tool for maintenance.

The nacelle 120 may be installed on the tower 110 to be able to yaw with respect to the tower 110. In other words, the nacelle 120 may be positioned on the tower 110 and rotatably coupled to the tower 110.

The nacelle 120 may be a housing for accommodating a generator or the like, and may have a hexahedral shape. However, the shape of the nacelle 120 is not necessarily limited thereto, and the nacelle 120 may be formed in a cylinder, an ellipsoid, or the like.

The rotor 130 includes a hub 131 and a plurality of blades 132, and the hub 131 is rotatably installed on a front surface of the nacelle 120. The plurality of blades 132 are coupled to an outer peripheral surface of the hub 131 while being spaced apart from each other at predetermined intervals in a circumferential direction. Although FIG. 1 illustrates that three blades 132 are installed on one hub 131, but the present disclosure is not limited thereto.

The plurality of blades 132 are rotated about a central axis of the hub 131 by wind. Each of the blades 132 has a streamlined cross-section in a width direction, and a space may be formed therein.

Figure 2:
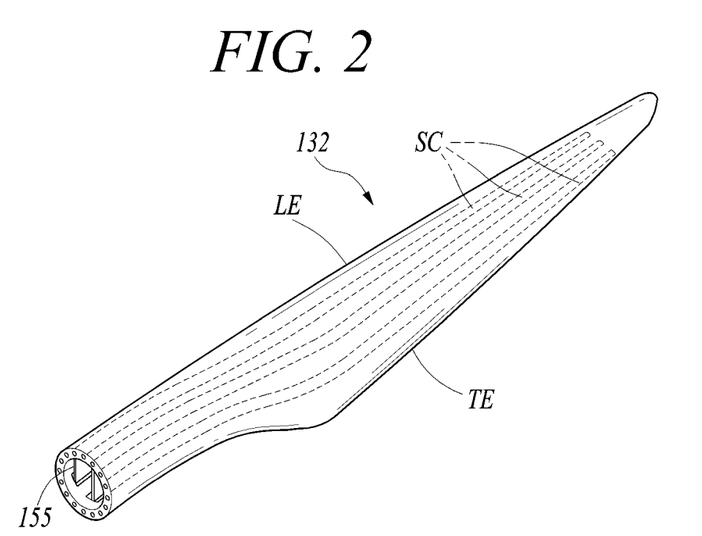
FIG. 2 is a perspective view illustrating one blade according to the first exemplary embodiment.
Figure 3:
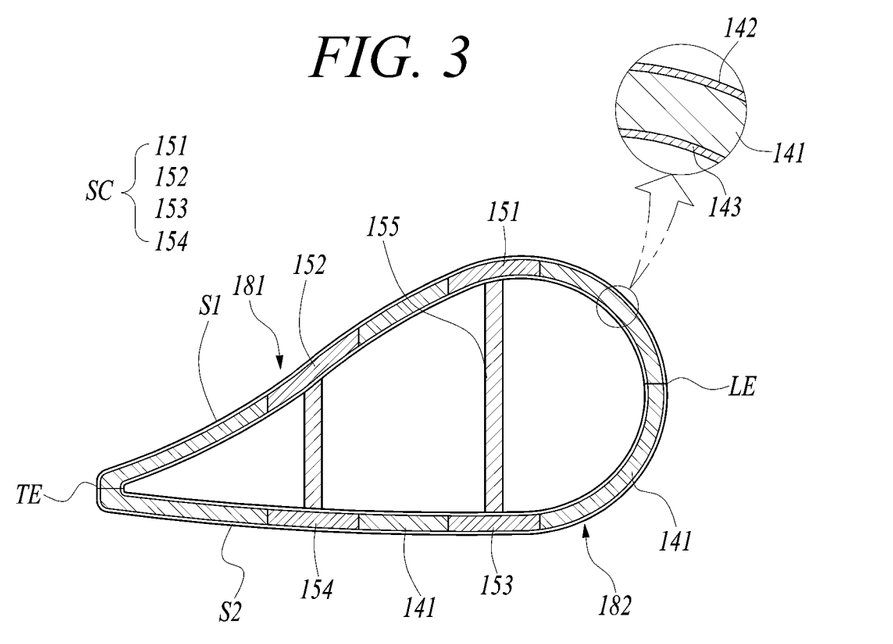
FIG. 3 is a cross-sectional view of the blade according to the first exemplary embodiment.

FIG. 2 is a perspective view illustrating one blade according to the first exemplary embodiment. FIG. 3 is a cross-sectional view of the blade according to the first exemplary embodiment.

Referring to FIGS. 2 and 3, the blade 132 includes a cylindrical part connected to the hub 131 and has an airfoil cross-section outwardly.

The blade 132 having an airfoil shape in cross-section includes a suction side S2 and a pressure side S1. The rotor 130 is rotated by the difference in pressure between the suction side S2 and the pressure side S1. The blade 132 includes a leading edge LE through which the wind enters and a trailing edge TE through which the wind exits. The blade 132 has a relatively flat extension adjacent to the leading edge LE and a large bend adjacent to the trailing edge TE.

The blade 132 may include an outer skin 142, core panels 141, an inner skin 143, spar caps SC, and shear webs 155.

The outer skin 142, the core panels 141, the inner skin 143, and the spar caps SC form a pressure side shell 181 and a suction side shell 182, and the pressure side shell 181 and suction side shell 182 are joined to form the blade 132.

The core panels 141 are positioned between the inner skin 143 and the outer skin 142. The blade 132 may be in a form of a sandwich panel in which the inner skin 143 and the outer skin 142 surround the core panels 141 and the spar caps SC.

The inner skin 143 and the outer skin 142 may be made of fiber-reinforced plastic (FRP). For example, the inner skin 143 and the outer skin 142 may be made of glass-fiber-reinforced plastic (GFRP) or carbon-fiber-reinforced plastic (CFRP). The core panels 141 may be made of balsa wood or foam. The core panels 141 may be made of urethane foam. The core panels 141 may be disposed between the spar caps SC and outside the spar caps SC.

The spar caps SC are respectively positioned between the core panels 141 to enhance the rigidity of the blade 132. Each of the spar caps SC may be in a form of a plate having a predetermined width extending in a longitudinal direction of the blade 132. The spar caps SC are spaced apart from each other in a thickness direction of the blade 132 and are installed on the pressure side S1 and the suction side S2.

The shear webs 155 connect the spar caps SC installed on the pressure side S1 and the spar caps SC installed on the suction side S2, and are installed upright in the thickness direction of the blade 132. For example, two shear webs 155 spaced apart from each other in the width direction of the blade 132 may be installed in the blade 132. The shear webs 155 may extend in the longitudinal direction of the blade 132.

The shear web 155 disposed adjacent to the trailing edge TE has one end coupled to an associated spar cap SC including reinforcing fiber sheets 163 and the other end coupled to an associated spar cap SC including support plates 161. As described above, according to the first exemplary embodiment, one shear web 155 may be coupled to the spar caps SC having different structures to support the blade 132.

Each of the shear webs 155 may be in the form of a sandwich panel and may support a load by connecting the associated spar caps SC. The shear web 155 may have a structure in which a foam or wood is inserted between metal plates or fiber-reinforced plastic plates.

Figure 4:
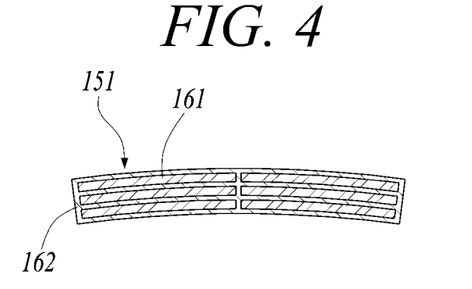
FIG. 4 is a cross-sectional view illustrating a first spar cap according to the first exemplary embodiment.
Figure 5:
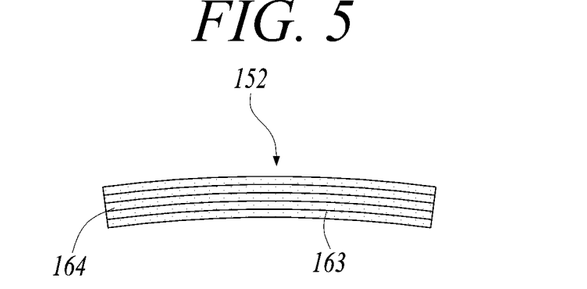
FIG. 5 is a cross-sectional view illustrating a second spar cap according to the first exemplary embodiment.
Figure 6:
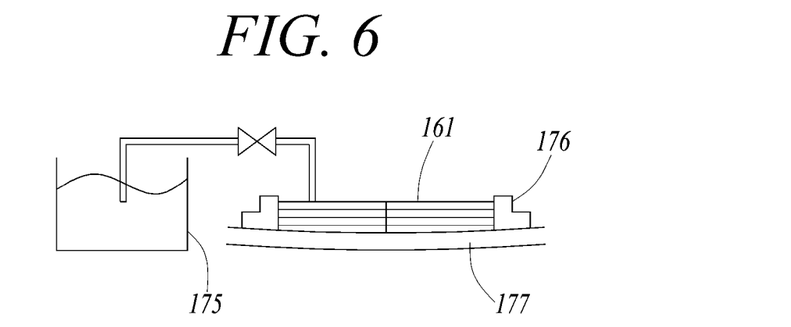
FIG. 6 is a view illustrating a process of manufacturing the first spar cap according to the first exemplary embodiment.
Figure 7:
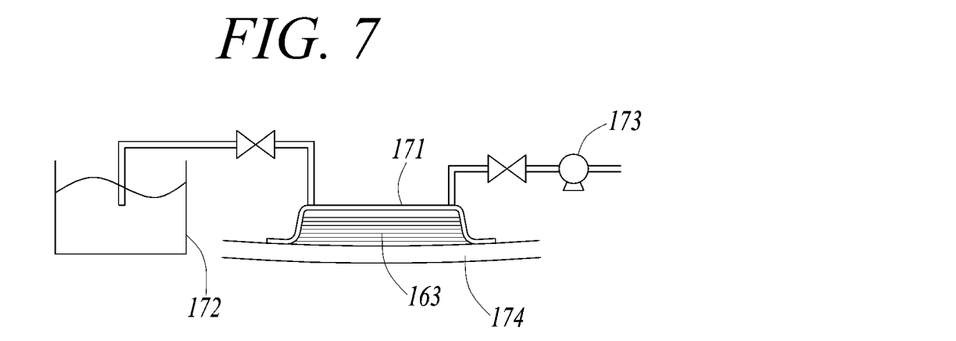
FIG. 7 is a view illustrating a process of manufacturing the second spar cap according to the first exemplary embodiment.
Figure 8:
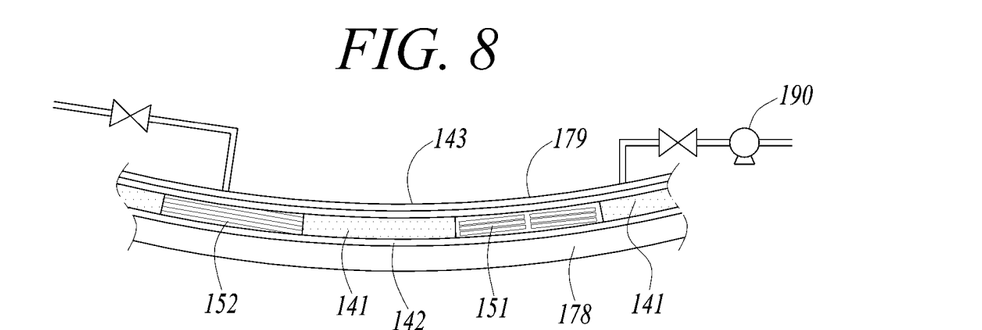
FIG. 8 is a view illustrating a process of coupling the first and second spar caps to an outer skin according to the first exemplary embodiment.

FIG. 4 is a cross-sectional view illustrating a first spar cap according to the first exemplary embodiment. FIG. 5 is a cross-sectional view illustrating a second spar cap according to the first exemplary embodiment. FIG. 6 is a view illustrating a process of manufacturing the first spar cap according to the first exemplary embodiment. FIG. 7 is a view illustrating a process of manufacturing the second spar cap according to the first exemplary embodiment. FIG. 8 is a view illustrating a process of coupling the first and second spar caps to an outer skin according to the first exemplary embodiment.

Referring to FIGS. 3 to 5, the blade 132 may include a first spar cap 151 positioned adjacent to the leading edge LE on the pressure side S1, a second spar cap 152 positioned adjacent to the trailing edge TE on the pressure side S1, a third spar cap 153 positioned adjacent to the leading edge LE on the suction side S2, and a fourth spar cap 154 positioned adjacent to the trailing edge TE on the suction side S2.

Here, the first spar cap 151, the third spar cap 153, and the fourth spar cap 154 may be first-type spar caps each having a structure in which support plates 161 including reinforcing fibers are stacked, and the second spar cap 152 may be a second-type spar cap in which a resin is impregnated with reinforcing fiber sheets 163.

The first spar cap 151 and the second spar cap 152 are spaced apart from each other on the pressure side S1, and the third spar cap 153 and the fourth spar cap 154 are spaced apart from each other on the suction side S2. One of the core panels 141 may be positioned between the first spar cap 151 and the second spar cap 152, and another core panel 141 may be positioned between the third spar cap 153 and the fourth spar cap 154.

The first spar cap 151, the third spar cap 153, and the fourth spar cap 154 may each have a structure in which the support plates 161 including reinforcing fibers are stacked. Here, the reinforcing fibers may be carbon fibers.

Here, because the third spar cap 153 and the fourth spar cap 154 have the same structure as the first spar cap 151, the description of the first spar cap 151 will replace the description of the third spar cap 153 and the fourth spar cap 154.

The first spar cap 151 may include support plates 161 and a resin bonding layer 162 for fixing the support plates 161. The resin bonding layer 162 may be made of a polyester resin, an epoxy resin, or the like.

Referring to FIG. 6, a detachable guide block 176 is installed at side ends of the support plates 161 in a state in which the support plates 161 are stacked on a mold 177. In this state, the resin stored in a container 175 is injected into the mold 177 to form a structure in which the support plates 161 are bonded by the resin bonding layer 162.

Each of the support plates 161 may be an elongated plate formed by drawing a reinforcing fiber and a resin. Here, the reinforcing fiber constituting the support plate 161 may be made of a carbon fiber. The strength of each spar cap SC can be improved because the spar cap SC is formed by stacking the support plates 161 including carbon fibers.

The second spar cap 152 may include reinforcing fiber sheets 163 and a resin body 164 for supporting the reinforcing fiber sheets 163. The resin body 164 may be made of reinforcing-fiber-reinforced plastic. Here, the reinforcing fiber may be a glass fiber. The resin body 164 surrounds and supports the reinforcing fiber sheets 163.

Referring to FIG. 7, the reinforcing fiber sheets 163 are wrapped with a film-type cover 171 in a state in which the reinforcing fiber sheets 163 are stacked on a mold 174. In this state, the resin stored in a container 172 is injected into the mold 174, and the air within the cover 171 is discharged by a vacuum pump 173. Accordingly, the reinforcing fiber sheets 163 are fixed inside the resin body 164 while preventing pores from being formed between the reinforcing fiber sheets 163.

The second spar cap 152 may have a structure in which a polyester resin or an epoxy resin is impregnated with the reinforcing fiber sheets 163 so that the reinforcing fiber sheets 163 are integrally formed with the resin body 164.

Referring to FIG. 8, to form the pressure side shell 181 or the suction side shell 182, the spar caps 151, 152 and the core panels 141 are positioned on a main mold 178, the outer skin 142 is placed below them, and the inner skin 143 is placed above them. The outer skin 142 and the inner skin 143 may each be formed of a glass fiber sheet or a carbon fiber sheet. Alternatively, each of the outer skin 142 and the inner skin 143 may be formed of a hybrid fiber sheet including glass and carbon fibers.

The inside of the cover 179 is connected to the vacuum pump 190 in a state in which the main mold 178 is wrapped with the film-type cover 179 to form a shell by injecting a resin while a vacuum pressure is applied to the space between the cover 179 and the main mold 178.

If the resin is injected, the resin is adhered to the outer skin 142 and the inner skin 143. In addition, the outer skin 142 and the inner skin 143 may be integrally fixed to the core panels 141 and the spar caps SC by the resin.

Because the reinforcing fiber sheets 163 have flexibility, the reinforcing fiber sheets 163 may easily reflect the bent shape and the twisted shape of the blade 132. However, it may be difficult for the support plates 161 to reflect the bent part of the blade 132 because the support plates 161 are relatively inflexible and are not easily bent.

According to the first exemplary embodiment, because the second spar cap 152 formed by impregnating the resin with the reinforcing fiber sheets 163 is disposed adjacent to the trailing edge TE of the pressure side S1, the degree of freedom in design of the blade 132 can be improved by freely forming the shape of the trailing edge TE.

In addition, because the first spar cap 151 and the third spar cap 153 having a structure in which the support plates 161 are stacked are disposed in the side of the leading edge LE extending in a straight line receiving a relatively large load, the strength of the blade 132 can be improved.

Furthermore, because the fourth spar cap 154 in which the support plates 161 are stacked is disposed in the portion adjacent to the trailing edge TE on the suction side S2 which is relatively less bent compared to the pressure side S1, the strength of the blade 132 can be improved.

Figure 9:
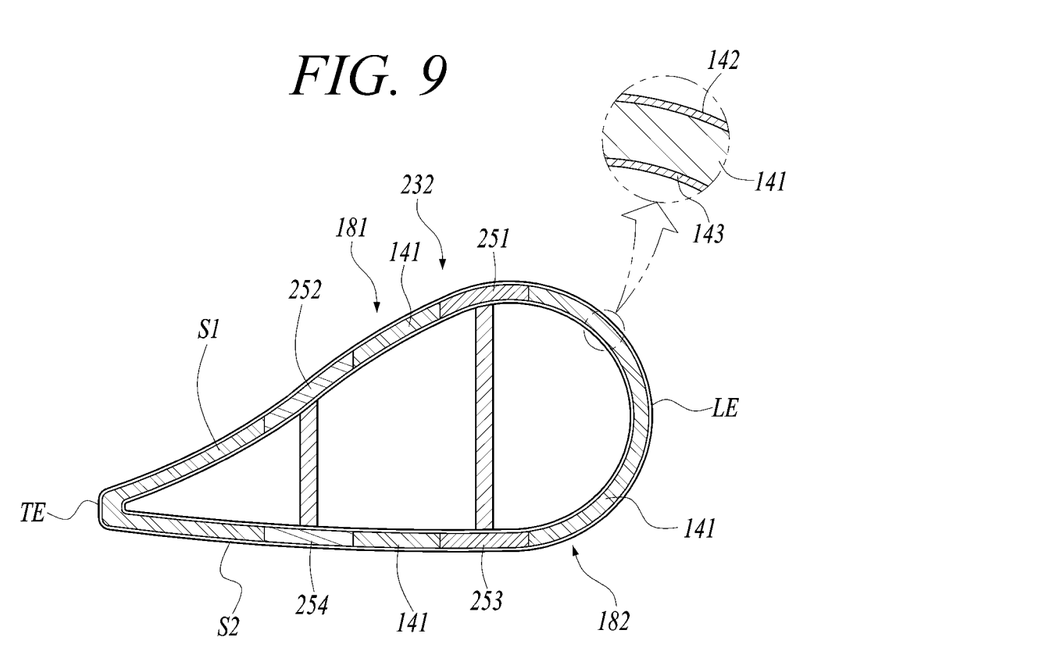
FIG. 9 is a cross-sectional view of one blade according to a second exemplary embodiment.

Hereinafter, a blade according to a second exemplary embodiment will be described. FIG. 9 is a cross-sectional view of one blade according to the second exemplary embodiment.

Referring to FIG. 9, the blade 232 may include a first spar cap 251 positioned adjacent to a leading edge LE on a pressure side S1, a second spar cap 252 positioned adjacent to a trailing edge TE on the pressure side S1, a third spar cap 253 positioned adjacent to the leading edge LE on the suction side S2, and a fourth spar cap 254 positioned adjacent to the trailing edge TE on the suction side S2.

Here, the first spar cap 251 and the third spar cap 253 may be first-type spar caps each having a structure in which support plates including reinforcing fibers are stacked, and the second spar cap 252 and the fourth spar cap 254 may be second-type spar caps each having a structure in which a resin is impregnated with reinforcing fiber sheets.

The first spar cap 251 and the second spar cap 252 are spaced apart from each other on the pressure side S1, and the third spar cap 253 and the fourth spar cap 254 are spaced apart from each other on the suction side S2. A core panel 141 may be positioned between the first spar cap 251 and the second spar cap 252, and another core panel 141 may be positioned between the third spar cap 253 and the fourth spar cap 254.

According to the second exemplary embodiment, because the second spar cap 252 and the fourth spar cap 254 each formed by impregnating a resin with glass fiber sheets are disposed adjacent to the trailing edge TE, the degree of freedom in design of the blade 232 can be improved by freely forming the shape of the trailing edge TE. In addition, because the first spar cap 251 and the third spar cap 253 each having a structure in which the support plates including carbon fibers are stacked are disposed in the side of the leading edge LE extending in a straight line receiving a relatively large load, the strength of the blade 232 can be improved.

Figure 10:
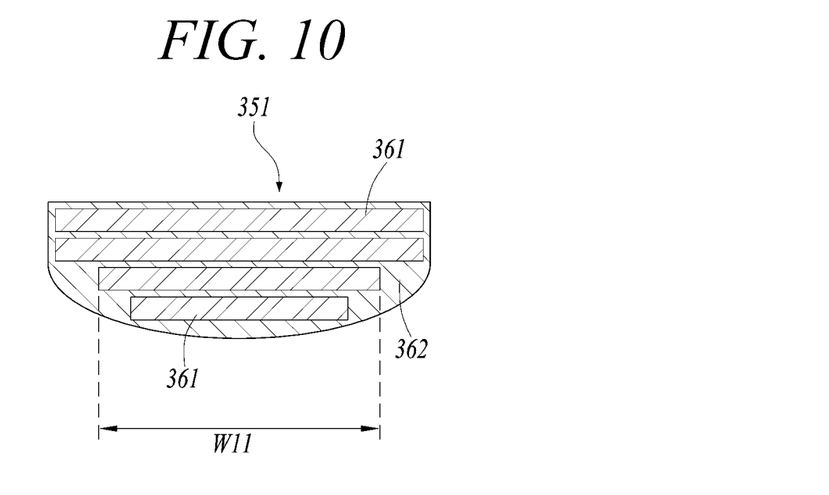
FIG. 10 is a cross-sectional view illustrating a first spar cap according to a third exemplary embodiment.

Hereinafter, a blade according to a third exemplary embodiment will be described. FIG. 10 is a cross-sectional view illustrating a first spar cap according to the third exemplary embodiment.

Referring to FIG. 10, because the blade according to the third exemplary embodiment has the same structure as the blade according to the first exemplary embodiment except for a first spar cap 351, a redundant description will be omitted.

The first spar cap 351 may have a structure in which support plates 361 including carbon fibers are stacked. The first spar cap 351 may include support plates 361 and a resin bonding layer 362 for fixing the support plates 361. In the first spar cap 351, the outermost support plate 361 may have a smaller width W11 than the inner support plates 361.

Accordingly, because the first spar cap 351 is shaped to coincide with the outer surface of the blade curved in the form of an arc, the blade can be supported more stably.

As described above, according to the exemplary embodiments, the freedom of design of the blade can be improved because some spar caps include the glass fiber sheets, and the strength of the blade can be improved because other spar caps have a structure in which the support plates including the carbon fibers are stacked.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A wind turbine blade comprising:
   an outer skin defining an external appearance;
   an inner skin spaced apart from the outer skin;
   a plurality of spar caps positioned between the outer skin and the inner skin and spaced apart from each other in a thickness direction of the blade; and
   shear webs configured to connect the plurality of spar caps,
   wherein at least one of the plurality of spar caps has a second structure in which a resin body made of glass-fiber-reinforced plastic is impregnated with, surrounds and supports reinforcing fiber sheets, and the other spar caps each have a first structure in which support plates including reinforcing fibers are stacked, the second structure providing a relatively higher flexibility than the first structure,
   wherein a thickness of each support plate is larger than a gap between the adjacent support plates in the first structure and a thickness of each reinforcing fiber sheet in the second structure is smaller than a gap between the adjacent reinforcing fiber sheets,
   wherein:
   the blade has an airfoil cross-section and comprises a pressure side, a suction side, a leading edge through which wind enters, and a trailing edge through which wind exits; and
   the blade comprises a first spar cap positioned adjacent to the leading edge on the pressure side, a second spar cap positioned adjacent to the trailing edge on the pressure side, a third spar cap positioned adjacent to the leading edge on the suction side, and a fourth spar cap positioned adjacent to the trailing edge on the suction side, wherein the fourth spar cap has the first structure and the second spar cap has the second structure.

2. The wind turbine blade according to claim 1, wherein the spar cap in the second structure is coupled to one end of an associated one of the shear webs.

3. The wind turbine blade according to claim 2, wherein the spar caps in the first structure are coupled to the other ends of associated ones of the shear webs.

4. The wind turbine blade according to claim 1, wherein the first spar cap has the first structure.

5. The wind turbine blade according to claim 4, wherein the third spar cap has the first structure.

6. The wind turbine blade according to claim 5, wherein the support plates, in the first structure, are bonded through a resin bonding layer.

7. The wind turbine blade according to claim 1, wherein, in the first structure, the support plates are configured such that an outer support plate has a smaller width than an inner support plate.

8. A wind turbine comprising:
a tower installed upright;
a nacelle installed on the tower; and
a rotor rotatably installed on the nacelle and comprising a plurality of blades,
wherein each of the plurality of blades comprises:
an outer skin defining an external appearance;
an inner skin spaced apart from the outer skin;
a plurality of spar caps positioned between the outer skin and the inner skin and spaced apart from each other in a thickness direction of the blade; and
shear webs configured to connect the plurality of spar caps,
wherein at least one of the plurality of spar caps has a second structure in which a resin body made of glass-fiber-reinforced plastic is impregnated with, surrounds and supports reinforcing fiber sheets, and the other spar caps each have a first structure in which support plates including reinforcing fibers are stacked, the second structure providing a relatively higher flexibility than the first structure,
wherein a thickness of each support plate is larger than a gap between the adjacent support plates in the first structure and a thickness of each reinforcing fiber sheet in the second structure is smaller than a gap between the adjacent reinforcing fiber sheets,
wherein:
the blade has an airfoil cross-section and comprises a pressure side, a suction side, a leading edge through which wind enters, and a trailing edge through which wind exits; and
the blade comprises a first spar cap positioned adjacent to the leading edge on the pressure side, a second spar cap positioned adjacent to the trailing edge on the pressure side, a third spar cap positioned adjacent to the leading edge on the suction side, and a fourth spar cap positioned adjacent to the trailing edge on the suction side,
wherein the fourth spar cap has the first structure and the second spar cap has the second structure.

9. The wind turbine according to claim 8, wherein the spar cap in the second structure is coupled to one end of an associated one of the shear webs.

10. The wind turbine according to claim 9, wherein the spar caps in the first structure are coupled to the other ends of associated ones of the shear webs.

11. The wind turbine according to claim 8, wherein the first spar cap has the first structure.

12. The wind turbine according to claim 11, wherein the third spar cap has the first structure.

13. The wind turbine according to claim 12, wherein the support plates, in the first structure, are bonded through a resin bonding layer.

14. The wind turbine to claim 8, wherein the support plates, in the first structure, are configured such that an outer support plate has a smaller width than an inner support plate.

* * * * *